United States Patent [19]

Nbedi et al.

[11] Patent Number: 5,019,692

[45] Date of Patent: May 28, 1991

[54] THERMOSTATIC DEVICE FOR FUSER

[75] Inventors: Sylvain L. Nbedi; Robert D. Bobo, both of Rochester; Socrates Hryhorenko, Sodus, all of N.Y.

[73] Assignee: Eastman Kodak Company, Rochester, N.Y.

[21] Appl. No.: 500,977

[22] Filed: Mar. 29, 1990

[51] Int. Cl.⁵ .............................................. H05B 1/02
[52] U.S. Cl. .................................. 219/469; 217/216; 374/153
[58] Field of Search ............... 219/216, 469, 470, 471, 219/512, 388; 337/394, 354, 153; 355/290; 432/60, 228; 374/153, 154, 187

[56] References Cited

U.S. PATENT DOCUMENTS

| | | | |
|---|---|---|---|
| 1,889,385 | 11/1932 | Schuster | 374/153 |
| 2,947,171 | 8/1960 | Peltola | 374/153 |
| 3,469,077 | 9/1969 | Peterson | 219/471 |
| 3,470,518 | 9/1969 | Schmitt | 337/394 |
| 3,768,057 | 10/1973 | Sekira | 337/354 |
| 4,349,806 | 9/1982 | Boulanger | 337/354 |
| 4,708,495 | 11/1987 | Kitzinger | 374/154 |

Primary Examiner—Teresa J. Walberg
Attorney, Agent, or Firm—Leonard W. Treash, Jr.

[57] ABSTRACT

A thermostatic device particularly usable in sensing the surface tempoerature of a rotatable member in a fuser includes a rotatable roller mountable in rolling engagement with a moving surface. A heat sensor located inside the roller senses temperature variations in the roller. For example, a pin that is spring-urged against the inside surface of the roller, moves a switch between open and closed conditions as the inside diameter of the roller varies with a change in its temperature. Alternatively, a bimetallic disc positioned in engagement with the inside surface of the roller is sensed to open or close a switch in response to the roller temperature reaching a given threshold.

6 Claims, 3 Drawing Sheets

THERMOSTATIC DEVICE FOR FUSER

TECHNICAL FIELD

This invention relates to temperature controls for electrostatographic fusers. It also relates to devices for sensing the temperature characteristics of a moving surface.

BACKGROUND ART

Electrophotographic copiers and printers create a loose toner image on paper. The most common method of fixing the toner image to the paper is to feed the paper and image between a pair of fusing rolls. The toner image is then fixed to the paper by a combination of heat and pressure applied to the image by the rolls.

The toners used have a thermoplastic component which softens in response to heat. Such systems are effective within a narrow temperature range which must be high enough to soften a thermoplastic having a glass transition temperature high enough to have good keeping characteristics. At the same time the fuser cannot be so hot as to char the paper or risk starting a fire. Not surprisingly, quality temperature sensors are used in all such systems both to control the heat being applied to the fuser as the temperature varies but also sensors to prevent damage if the system severely overheats.

Temperature sensors can be placed, and are placed, in the core of an internally heated fusing roll, on the surface of the fusing or other roll and in the air surrounding either roll. For a number of reasons, it is especially desirable to know the temperature of the surface of the fusing roll. This is especially true in systems in which the fusing roll itself is externally heated, for example, by contact with heating rollers.

Sensing the temperature of the surface of any of the rolls in a fuser has created problems for the industry. Present approaches include placing a commercial thermostat in direct contact with the surface. Typical thermostats used for contact sensing include a bimetal disc whose direction of curvature changes from convex to concave according to a threshold temperature and a mechanical switch responsive to such change in curvature. A metal housing is positioned between the bimetal disk and the roll. If the metal housing is not in contact with the roll, response through the air gap is quite slow. Even with the metal housing in contact, temperature response is relatively slow and the additional problem of wear between the fusing roll and the housing of the thermostat is present.

Attempts at reducing the wear include placement of a carbon-shoe between the thermostat and the roll which carbon-shoe is shaped to the contour of the roll and conducts the heat reasonably well to the thermostat.

Unfortunately, all of the above devices show a slow response to changes in temperature. That is, if the device is being used as a safety sensor, a rapid rise in the temperature of the surface of the roller will not be sensed by the safety sensor until a certain length of time thereafter. This forces the setting of the thermostat at a relatively low temperature in order to be sure to cut off before the paper chars or a fire begins. Such a low temperature is unfortunately close to the operating temperature of the fuser itself providing very little margin for ordinary fluctuations and forcing use of lower temperature fusing materials than desirable.

The problem of slow response time in responding to a change in the surface temperature of a roll used in fusing is generally troublesome for the industry with conventional internally heated rolls. However, when a fusing roll is heated externally, the problem is magnified. An externally heated fusing roll can be heated rapidly in response to an appropriate signal. This characteristic is quite advantageous for control of the fusing temperature itself. However, it also means that the temperature can reach a danger point quite rapidly if something goes wrong with its control system. The safety cut off circuitry therefore must have a fast response time to prevent charring of paper or a fire.

STATEMENT OF THE INVENTION

It is the object of the invention to provide a thermostatic device responsive to the temperature of a moving surface which device has an improved response time.

This and other objects are accomplished by a thermostatic device which includes a rotatable roller which is mountable in rolling contact with the moving surface, the temperature of which is to be monitored. Means are located inside the rotatable roller for creating an electric signal responsive to the temperature of the roller.

With this structure, the roller continually rolls on the moving surface rapidly assuming the temperature of that surface with minimal wear between the moving surface and the roller. The portion of the device inside the roller can readily sense the temperature of the roller to provide a thermostatic device usable with the moving surface and having a fast response time.

According to a preferred embodiment, the roller is made of a heat-conductive material, for example an ordinary metal, which changes its inner diameter when in cylindrical form as a function of temperature. The inner diameter of the roller is continually sensed mechanically to open or close a switch in response to that diameter passing a particular threshold.

According to another preferred embodiment a bimetallic thermocouple material is positioned adjacent the inside surface of the cylinder. The bimetallic material is utilized to provide a mechanical output indicative of the temperature of the roller which mechanical output can be used to open or close a switch as the temperature of the roller crosses a threshold.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

Figure 1:
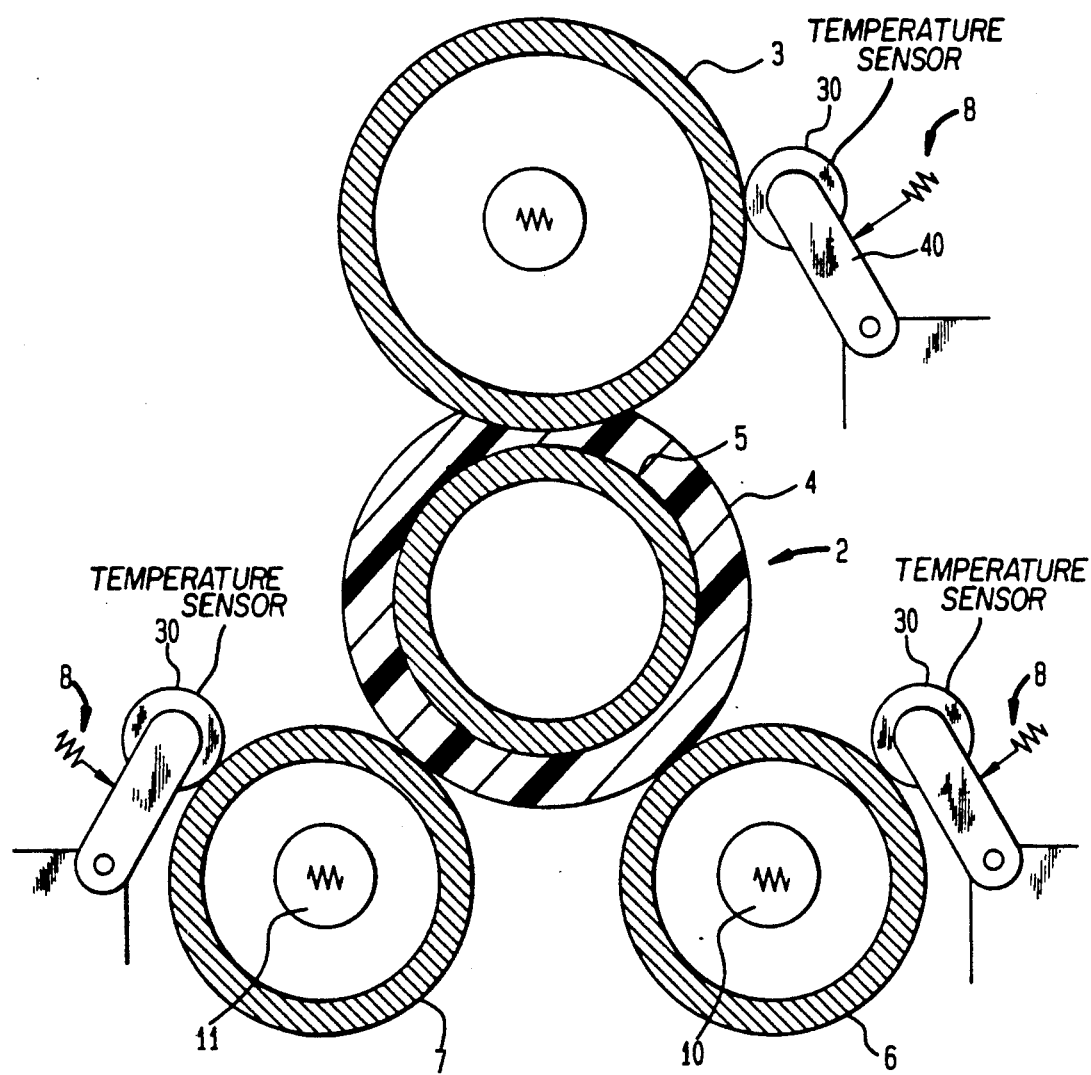
FIG. 1 is a side section of a fuser in which the invention is particularly usable.

FIG. 1 illustrates a fuser for electrophotographic or other apparatus in which the invention is particularly usable. According to FIG. 1 a heated pressure roll fuser includes a fusing roll 2 and a pressure roll 3. The rolls typically have surfaces which have good release characteristics and may be coated with silicone oil to prevent offset of toner onto either roller. Pressure roll 3 is shown as a hard metallic roller which is internally heated. Fusing roll 2 has a somewhat compliant outer layer or layers 4 made of a material such as silicone rubber or other material which is compliant enough to form a nip of some width with pressure roll 3. Outer layer or layers 4 are positioned on a core 5 which generally is of aluminum, glass or similar hard material. Because the compliant material 4 does not conduct heat as well as metallic pressure roll 3, the surface of fusing roll 2 is heated by a pair of metallic heating rollers 6 and 7 which are heated internally by lamps 10 and 11.

The design shown in FIG. 1 is known for its efficient use of heat and rapid response to variations in temperature because the surface of the roller 2 is heated directly by heating rollers 6 and 7 rather than being heated through a heat-absorbing core 5 and compliant layer 4.

Figure 2:
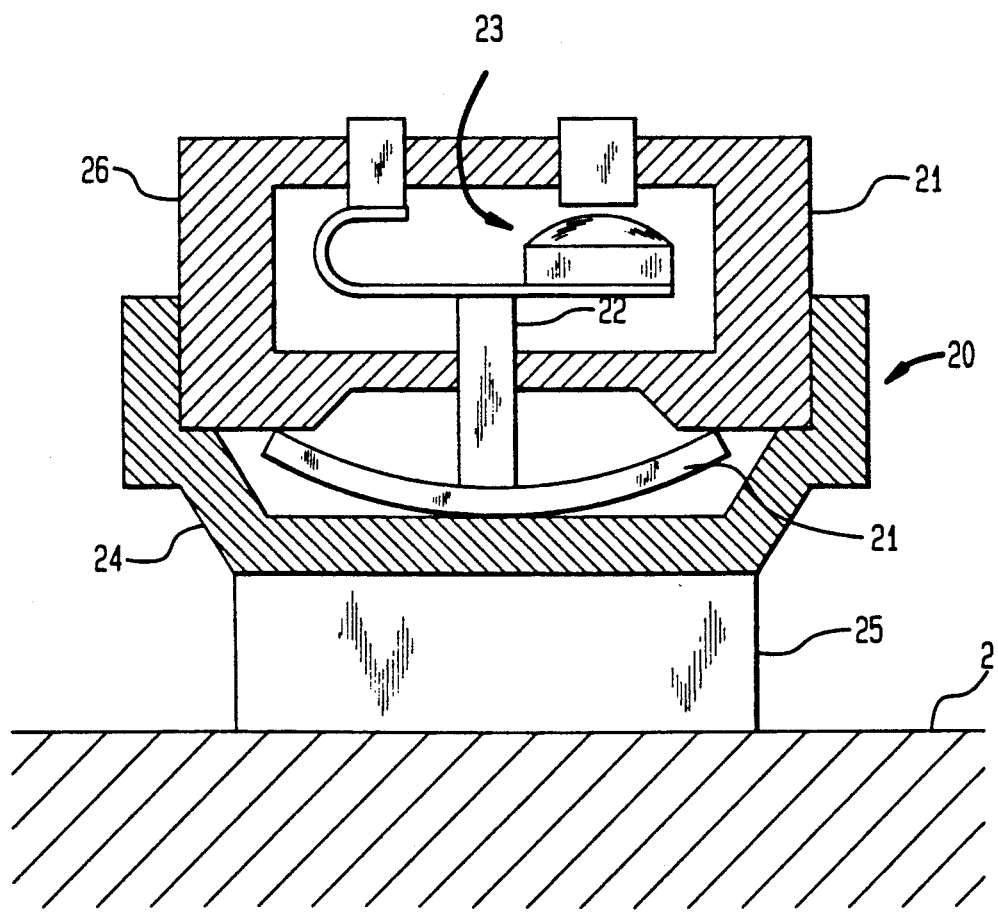
FIG. 2 is a section of a prior art thermostatic device in a position responsive to the temperature of the surface of a fusing roll.

It is absolutely necessary that a fuser such as that shown in FIG. 1 be provided with a safety device which shuts off all power to the fuser in the event that the fuser reaches an unsafe temperature. FIG. 2 illustrates a thermostatic device presently used for such a purpose. According to FIG. 2, a thermostatic device 20 includes a bimetallic disc 21 which changes its curvature in response to temperature. More specifically, as the temperature rises, bimetallic disc 21 changes its curvature from concave (as shown) to convex. This movement is quick and forceful, and moves a ceramic pin 22 upward as seen in FIG. 2. Ceramic pin 22 engages a switch 23 which switch moves toward closure as pin 22 moves upward. The device can be calibrated to close the switch 23 at a given temperature. The electrical components are held in an insulating support 26 but the bimetallic disc 21 is protected by a metal shield 24.

This device is most responsive when metal shield 24 is placed directly in contact with fusing roll 2. However, when placed in contact, excessive wear between the elements results. A carbon-shoe 25 has been placed between the metallic cover 24 and fusing roll 2 which shoe is shaped to conform to roller 2 and does not create as much wear as does the metal cover 24. However, the addition of the carbon-shoe 25 further slows the response time of the thermostatic device 20. A slow response time of the thermostatic device requires that the set point for it be set at a lower temperature in order to prevent charring of paper if the ordinary control system fails. This reduces the temperature that the fusing roll 2 can be used for fusing. This is a particularly serious problem with fusers which have a natural fast response time themselves such as the fuser shown in FIG. 1 in which the fusing roll 2 is externally heated.

Figure 3:
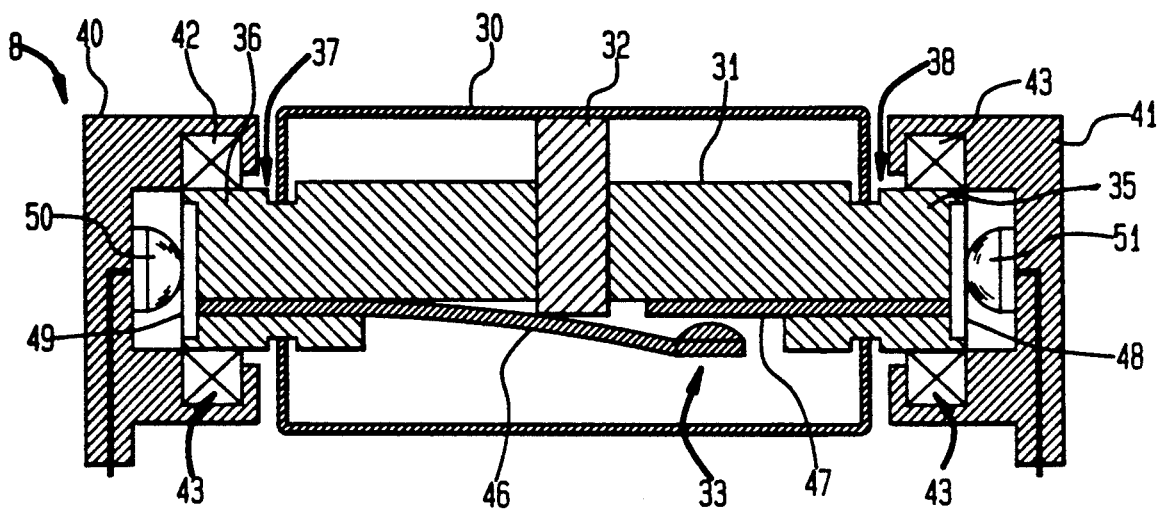
FIG. 3 is a front cross-section of a thermostatic device constructed according to the invention.
Figure 4:
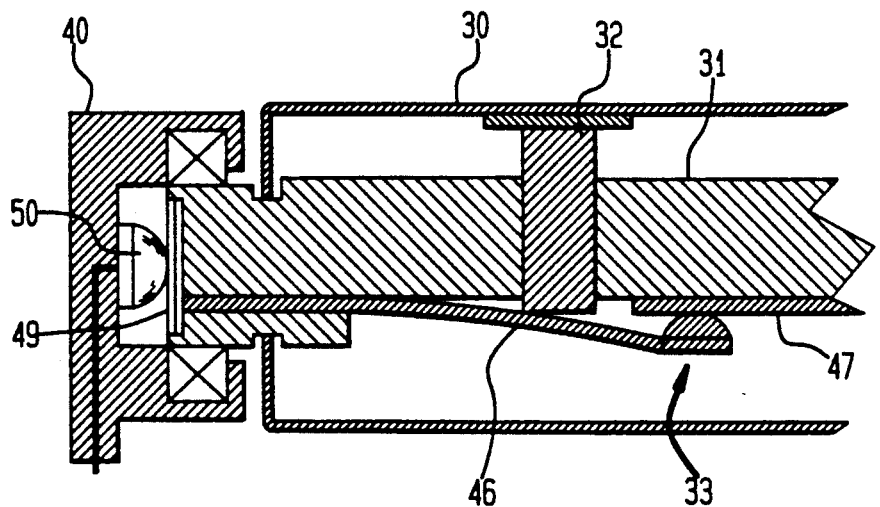
FIGS. 4 and 5 are front and side cross-sections respectively of a thermostatic device constructed according to an alternative embodiment of the invention.
Figure 5:
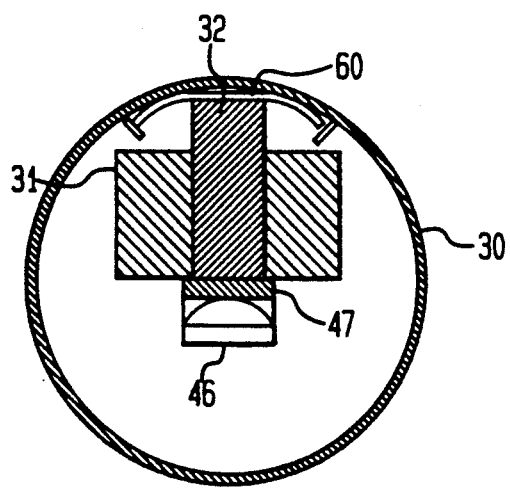

FIGS. 3, 4 and 5 show alternate embodiments of a thermostatic device designed to not only cure this particular problem with roll fusers but to be used generally in sensing the temperature of a moving surface. According to FIG. 3, thermostatic device 8 includes a rotatable roller 30 preferably of metallic construction. Inside roller 30 is a heat insulative support 31 for roller 30, which support is rotatable with roller 30. A ceramic pin 32 is positioned in a hole in support 31, and has an end which rests directly against the inner surface of roller 30. The other end of ceramic pin 32 engages part of a switch 33 which is shown held by pin 32 in an open condition in FIG. 3. Support 31 includes end extensions 35 and 36 which have cylindrical outer bearing surfaces 37 and 38 coaxial with roller 30.

A pair of support arms 40 and 41 include ball bearings 42 and 43 which engage the bearing surfaces 37 and 38 on extensions 35 and 36 and hold support 31 for rotation with respect to arms 40 and 41.

Switch 33 is made up of first and second switching members 46 and 47 which are held in slots in support 31 in positions in which they are resiliently urged toward a closed position. The ends of members 46 and 47 away from their contacts include contact elements 48 and 49 positioned on outside lateral faces of extensions 35 and 36. Although contact elements 48 and 49 are shown as separate metallic elements in electrical contact with switch members 46 and 47, they could, of course, be made from single pieces with members 46 and 47 appropriately folded. Arms 40 and 41 contain arm contacts 50 and 51 resiliently urged by means not shown into contact with contact members 48 and 49.

In operation, arms 40 and 41 hold support 31 for rotation with roller 30. Roller 30 is lightly urged against the moving surface being monitored by a spring (FIG. 1) or gravity. Movement of the surface causes roller 30 to rotate with extensions 35 and 36 rotating on ball bearings 42 and 43 and contact elements 48 and 49 rotating on arm contacts 50 and 51.

As the surface temperature of the surface increases, that increase is immediately passed on to the roller 30. Because roller 30 is cylindrical in shape and is made of a material, for example, aluminum, which absorbs heat readily from fusing roll 2, roller 30 expands. More specifically, the inner diameter of roller 30 increases as the temperature of roller 30 increases. Pin 32 is urged against the inner surface of roller 30 by switch member 46 which is resiliently mounted for that purpose. As the inner diameter of roller 30 increases, pin 32 moves in an upward direction as seen in FIG. 3 permitting switch member 46 to move toward contact with switch member 47. Thermostatic device 8 thus can be calibrated to cause switch 33 to close at any given temperature by varying the length of pin 32, the vertical location of member 47, or another parameter of the system.

The device shown in FIG. 3 has two primary advantages over the prior art device shown in FIG. 2. First, roller 30 rolls with the moving surface being monitored and is subject only to rolling friction which causes minimal wear compared to the continual rubbing contact of the prior art. Second, roller 30 both contacts the surface being monitored and is the element that controls switch 33. That is, there are no intermediate elements for the heat to pass through between the surface being monitored and the sensitive element, roller 30 whose expansion or contraction controls switch 33. Thus, in addition to reducing wear the response time of the thermostatic device is greatly reduced compared to the prior art.

FIGS. 4 and 5 show an alternative embodiment of the invention in which a bimetallic disc 60 is positioned between the top of pin 32 and the inside surface of roller 30. Bimetallic disc 60 is similar to the disc 21 shown in FIG. 2 and used in thermostatic devices generally. It can be made to change from concave to convex at a given temperature giving a rapid mechanical output as it reaches that temperature. As shown in FIGS. 4 and 5 disc 60 is concave at a safe temperature to pin 32 but changes to convex at a cut-off temperature causing switch 33 to open. This approach is used in a circuit designed to have a continuing small current flowing while the fuser is on and to shutdown the entire fuser in response to switch 33 opening.

Note that the embodiment shown in FIG. 3 closes switch 33 as the temperature rises. However, by placing switch member 47 on the opposite side of switch member 46 from the side shown in FIG. 3, the switch 33 shown in FIG. 3 can be made to open as temperature rises.

The embodiment shown in FIGS. 4 and 5 has the same advantage as that shown in FIG. 3 of causing negligible wear between the thermostatic device and the fusing roll 2. The disc 60 essentially senses the temperature of the roller 30 and provides a mechanical output as a result of that sensing which is used to control the switch 33. The roller 30 thus is an intermediate member between the ultimate sensing member 60 and the fusing surface 2. However, the FIG. 4 and 5 embodiment has a faster response time than the prior art shown in FIG. 2 in which the carbon-shoe 25 is inserted between the thermostatic device and the fusing roll surface.

Referring to FIG. 1, note that thermostatic devices 8 have been positioned on all surfaces around sources of heat including pressure roll 3 and heating rollers 6 and 7. This gives the most rapid warning of danger. If fusing roller 2 were internally heated the device 8 would be placed on its surface.

Although the device is designed primarily as a safety switch to prevent charring or fire if for some reason the nip between the fusing roll and pressure roll becomes too hot, it can also be used as a thermostatic control of the fusing roll itself.

Although the structure is shown in its application in sensing the temperature of a surface in a pressure roll fuser, for which it is particularly designed and remarkably well suited, it clearly has general application to any environment in which it is desirable to sense the temperature of a moving surface. The surface need not be the surface of a roll since roller 30 can be rotated by any moving surface.

The invention has been described in detail with particular reference to a preferred embodiment thereof, but it will be understood that variations and modifications can be effected within the spirit and scope of the invention as described hereinabove and as defined in the appended claims.

We claim:

1. A fuser for fusing toner images to a receiving sheet, said fuser including:
   a movable member which becomes heated during operation,
   means for monitoring the temperature of a surface of said movable member, said means including
   a heat conductive roller mounted in rolling contact with said movable member and rotatable by said movable member and having an inside diameter which varies according to the temperature of said roller, and
   means positioned inside said roller for sensing the inside diameter of said roller and for creating an electrical signal in response to variations in said inside diameter.

2. A fuser according to claim 1 wherein said means for creating an electric signal includes an electrical switch which switch is variable between open and closed conditions according to a sensed threshold inside diameter of said roller.

3. A fuser according to claim 1 wherein said movable member is a rotatable member and in which said roller is mounted in rolling contact with the outside surface of said rotatable member.

4. For use in monitoring the temperature of a moving surface, a thermostatic device comprising:
   a heat conductive rotatable roller mountable in rolling contact with such a movable surface and having an inside diameter which varies according to the temperature of said roller, and
   means positioned inside said roller mechanically responsive to the inside diameter of said roller for converting a mechanical response to a change in said inside diameter into an electrical signal.

5. A thermostatic device according to claim 4 wherein said means for creating an electric signal includes an electrical switch which switches between open and closed conditions according to a sensed threshold of the inner diameter of said roller.

6. A thermostatic device for use in monitoring the temperature of a moving surface, said thermostatic device comprising:
   a rotatable roller mountable in rolling contact with such a movable surface,
   a support located primarily inside said roller for supporting said roller, said support having a pair of extensions beyond the ends of said roller, each such extension including a cylindrical bearing surface and a radial end surface,
   a pair of support arms for holding said roller support, said arms including bearings for contacting the cylindrical bearing surfaces of said extensions to permit rotation of said roller support with respect to said arms,
   a pair of conductive switch means positioned in slots in said roller support and movable between open and closed conditions according to a sensed change in the inner diameter of said roller, each of said switch means including contact surfaces located on the end surfaces of said support extensions, and
   a pair of contact elements, one fixed to each of said support arms for engaging said contact surfaces to provide electrical continuity from said switch elements.

* * * * *

UNITED STATES PATENT AND TRADEMARK OFFICE
CERTIFICATE OF CORRECTION

PATENT NO. : 5,019,692

DATED : May 28, 1991

INVENTOR(S) : Sylvain L. Ndebi, Robert D. Bobo and Socrates Hryhorenko

It is certified that error appears in the above-identified patent and that said Letters Patent is hereby corrected as shown below:

Title page, under item [19] in the heading, "Nbedi et al." should read --Ndebi et al.--; and
item [75] Inventors: "Nbedi" should read --Ndebi--.

Signed and Sealed this

Twentieth Day of October, 1992

Attest:

DOUGLAS B. COMER

Attesting Officer

Acting Commissioner of Patents and Trademarks